United States Patent
Urashima et al.

(10) Patent No.: US 9,963,767 B2
(45) Date of Patent: May 8, 2018

(54) INEXPENSIVE AUTOMOTIVE MEMBER AND FEED OIL PIPE, EXHIBITING EXCELLENT SALT CORROSION RESISTANCE

(71) Applicant: NIPPON STEEL & SUMIKIN STAINLESS STEEL CORPORATION, Tokyo (JP)

(72) Inventors: Hiroshi Urashima, Tokyo (JP); Shunji Sakamoto, Tokyo (JP); Shinichi Teraoka, Tokyo (JP); Toshio Tanoue, Tokyo (JP)

(73) Assignee: NIPPON STEEL & SUMIKIN STAINLESS STEEL CORPORATION, Tokyo (JP)

( * ) Notice: Subject to any disclaimer, the term of this patent is extended or adjusted under 35 U.S.C. 154(b) by 62 days.

(21) Appl. No.: 15/021,078

(22) PCT Filed: Sep. 12, 2014

(86) PCT No.: PCT/JP2014/074238
§ 371 (c)(1),
(2) Date: Mar. 10, 2016

(87) PCT Pub. No.: WO2015/037707
PCT Pub. Date: Mar. 19, 2015

(65) Prior Publication Data
US 2016/0230261 A1    Aug. 11, 2016

(30) Foreign Application Priority Data

Sep. 13, 2013 (WO) ............... PCT/JP2013/074839

(51) Int. Cl.
*C22C 38/60* (2006.01)
*B60K 15/04* (2006.01)
(Continued)

(52) U.S. Cl.
CPC ............ *C22C 38/60* (2013.01); *B60K 15/04* (2013.01); *C22C 38/00* (2013.01); *C22C 38/001* (2013.01);
(Continued)

(58) Field of Classification Search
CPC ......... C22C 38/60; C22C 38/00; C22C 38/28; C22C 38/54; C22C 38/001; C22C 38/002;
(Continued)

(56) References Cited

FOREIGN PATENT DOCUMENTS

| JP | 2002-242779 A1 | 8/2002 |
|----|----------------|--------|
| JP | 2003-277992 A1 | 10/2003 |

(Continued)

OTHER PUBLICATIONS

European Patent Application No. 14844177.7: Extended European Search Report dated Mar. 21, 2017.
(Continued)

*Primary Examiner* — Michael C Miggins
(74) *Attorney, Agent, or Firm* — Kratz, Quintos & Hanson, LLP

(57) ABSTRACT

An automotive member or a feed oil pipe includes: a member made of a ferritic stainless steel containing predetermined components containing 10.5% to 18.0% of Cr in mass %; a metal fitting made of an aluminized stainless steel sheet, the metal fitting being attached to the member; and a gap structure defined between the member and the metal fitting, the gap structure being exposed to a chloride environment, where the metal fitting has an Al-plating weight per unit area of 20 g/m² or more and 150 g/m² or less on a surface corresponding to a gap of the gap structure, and surfaces of the metal fitting and the non-aluminized member other than the gap are coated with a cation electrodeposition coating film having a thickness of 5 μm to 35 μm.

30 Claims, 4 Drawing Sheets

(51) Int. Cl.
| | |
|---|---|
| *C23C 2/12* | (2006.01) |
| *C25D 13/12* | (2006.01) |
| *C22C 38/00* | (2006.01) |
| *C22C 38/28* | (2006.01) |
| *C22C 38/54* | (2006.01) |
| *C23F 13/16* | (2006.01) |
| *F02M 37/00* | (2006.01) |
| *F16L 58/00* | (2006.01) |
| *F16L 3/237* | (2006.01) |
| *C23C 2/26* | (2006.01) |
| *C22C 38/02* | (2006.01) |
| *C22C 38/04* | (2006.01) |
| *C22C 38/06* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/30* | (2006.01) |
| *C22C 38/32* | (2006.01) |
| *C22C 38/48* | (2006.01) |
| *C22C 38/50* | (2006.01) |
| *C25D 7/04* | (2006.01) |
| *C25D 9/00* | (2006.01) |
| *C25D 13/14* | (2006.01) |
| *F16L 58/08* | (2006.01) |
| *B60K 15/035* | (2006.01) |
| *B60K 15/03* | (2006.01) |

(52) U.S. Cl.
CPC .......... *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/48* (2013.01); *C22C 38/50* (2013.01); *C22C 38/54* (2013.01); *C23C 2/12* (2013.01); *C23C 2/26* (2013.01); *C23F 13/16* (2013.01); *C25D 7/04* (2013.01); *C25D 9/00* (2013.01); *C25D 13/12* (2013.01); *C25D 13/14* (2013.01); *F02M 37/0017* (2013.01); *F16L 3/237* (2013.01); *F16L 58/00* (2013.01); *F16L 58/08* (2013.01); *B60K 2015/0346* (2013.01); *B60K 2015/03538* (2013.01); *B60K 2015/047* (2013.01); *B60K 2015/0458* (2013.01); *C23F 2213/32* (2013.01)

(58) Field of Classification Search
CPC ..... C22C 38/004; C22C 38/008; C22C 38/02; C22C 38/04; C22C 38/06; C22C 38/20; C22C 38/22; C22C 38/24; C22C 38/26; C22C 38/30; C22C 38/32; C22C 38/48; C22C 38/50; B60K 15/04; B60K 2015/03538; B60K 2015/0346; B60K 2015/0458; B60K 2015/047; C23C 2/12; C23C 2/26; C23F 13/16; C23F 2213/32; F02M 37/0017; F16L 58/00; F16L 3/237; F16L 58/08; C25D 7/04; C25D 9/00; C25D 13/14

See application file for complete search history.

(56) References Cited

FOREIGN PATENT DOCUMENTS

| | | |
|---|---|---|
| JP | 2004-21003 A1 | 1/2004 |
| JP | 2004-359187 A1 | 12/2004 |
| JP | 2005-206064 A1 | 8/2005 |
| JP | 2006-144040 A | 6/2006 |
| JP | 2006-231207 A1 | 9/2006 |
| JP | 2007-216935 A1 | 8/2007 |
| JP | 2012-12005 A1 | 1/2012 |
| JP | 2012-96570 A1 | 5/2012 |
| WO | WO 2012/086706 A1 | 6/2012 |

OTHER PUBLICATIONS

T. Kittaka; "Hot-Dip Al Coated Steel Sheet" Journal of the Surface Finishing Society of Japan; vol. 42; No. 2; 1991; pp. 27-35 (9 Sheets)/p. 3 of specification.

Y. Ohtake; "The Damage of Vulcanized Rubber by New Fuels for Automobile, Including Metal and Plastics;" Journal of Society of Rubber Science and Technology, Japan; vol. 81; No. 9; 2008; pp. 376-382 (7 Sheets)/p. 3 of specification.

J. Maki; "Aluminized Steel Sheets;" Journal of the Surface Finishing Society of Japan; vol. 62; No. 1; 2011; pp. 20-24 (5 Sheets)/p. 3 of specification.

International Search Report for International Application No. PCT/JP2014/074238 dated Dec. 2, 2014.

T. Kittaka; "Hot-Dip Al Coated Steel Sheet;" Journal of the Surface Finishing Society of Japan; vol. 42; No. 2; 1991; pp. 169-177 (p. 3 of the specification) (partial English translation).

Y. Ohtake; "The Damage of Vulcanized Rubber by New Fuels for Automobile, Including Metal and Plastics;" Journal of Society of Rubber Science and Technology, Japan; vol. 81, No. 9; 2008; pp. 376-382 (p. 3 of specification) (partial English translation).

J. Maki; "Aluminized Steel Sheets;" Journal of the the Surface Finishing Society of Japan; vol. 62; No. 1; 2011; pp. 20-24 (p. 3 of specification) (partial English translation).

STRUCTURE I

STRUCTURE II

INEXPENSIVE AUTOMOTIVE MEMBER AND FEED OIL PIPE, EXHIBITING EXCELLENT SALT CORROSION RESISTANCE

TECHNICAL FIELD

The present invention relates to an automotive member. Particularly, the present invention relates to a feed oil pipe made of a more inexpensive material than currently used SUS436L and having corrosion resistance equivalent to the currently used material.

BACKGROUND ART

United States laws and regulations obligate a feed oil pipe for an automobile to assure life of 15 years or 150,000 miles running. A feed oil pipe made of stainless steel (SUS436L: 17 Cr-1.2Mo) has been already put into practical use.

An automobile traveling in North America or Europe is exposed to an environment of a snow melting salt. Therefore, a material applied to a feed oil pipe requires excellent salt corrosion resistance, and SUS436L has been conventionally applied. However, in response to the recent increase in resource prices, reduction in material cost has come to be demanded. SUS436L contains about 1% of expensive Mo. Therefore, only by replacing SUS436L with AISI439 steel (17 Cr) not containing Mo, cost is significantly reduced. In a district other than North America or Europe (e.g. India, China, or South and Central America), since salt corrosion resistance at such a level as in North America or Europe is not necessary, the quality of SUS436L is excessive and a lower-grade and more inexpensive material has been demanded.

However, when the amount of an alloy element is excessively reduced in order to reduce cost, corrosion resistance is deteriorated. Therefore, a technology to compensate weakness due to a lower-grade material by another method is important.

A portion having a concern about corrosion in a feed oil pipe is crevice corrosion which occurs in a gap on an outer surface of the feed oil pipe exposed to a chloride environment. Conventionally, coating such as cation electrodeposition coating has been applied as a means for improving salt corrosion resistance in the gap.

For example, Patent Literature 1 discloses a production method of subjecting a feed oil pipe assembled by projection welding using a SUS436 pipe as a material to cation electrodeposition coating. However, this technology uses SUS436 as a material. According to knowledge of the inventors, rust prevention is not completely achieved even in SUS436. Therefore, it cannot be estimated that this technology can offer a sufficient rust prevention effect when a lower-grade material is used.

Patent Literature 2 discloses a technology of preventing crevice corrosion by subjecting a feed oil pipe assembled using SUS436 as a material to electrostatic coating. Alternatively, Patent Literature 3 discloses a technology of subjecting a stainless steel feed oil pipe to coating for chipping resistance and assuring a sufficient rust prevention property even when the feed oil pipe is subjected to chipping. However, these technologies require higher cost for coating than electrodeposition coating. Meanwhile, an inside of a gap cannot be coated, and therefore there is no guarantee that a sufficient rust prevention effect is obtained in the gap.

Patent Literature 4 discloses a technology of providing a projection on a gap-forming member and controlling an opening amount of the gap to 0.2 mm or more for covering an inside of the gap by electrodeposition coating.

On the other hand, a rust prevention method other than coating is also proposed. For example, Patent Literature 5 discloses a technology of applying sacrificial corrosion prevention by disposing a zinc sacrificial anode in a gap or a portion in which a passive state film is impaired by welding, brazing, plastic working, or the like in assembling a stainless steel feed oil pipe. However, it is troublesome and takes time to dispose zinc at all the portions having a concern about corrosion. As described in Non Patent Literature 1, zinc is consumed easily in a chloride environment, and therefore a large amount of zinc is disadvantageously required. In Patent Literature 6, a galvanized steel plate is used for an inlet pipe to eliminate a gap by filling the gap with melted zinc. However, as described above, zinc is consumed very easily in a chloride environment. Further, since an oil inlet enters an inlet pipe, melted zinc is likely to invade the inlet pipe to be reacted with water, so that a corrosion product such as zinc hydroxide may be formed to cause clogging of fuel injection equipment.

CITATION LIST

Patent Literature(s)

Patent Literature 1: JP-A-2002-242779
Patent Literature 2: JP-A-2004-21003
Patent Literature 3: JP-A-2006-231207
Patent Literature 4: JP-A-2012-12005
Patent Literature 5: JP-A-2005-206064
Patent Literature 6: JP-A-2012-96570

Non-Patent Literature(s)

Non Patent Literature 1: Toshiharu Kikko: Journal of The Surface Finishing Society of Japan, Vol. 42 (1991), No. 2, 169-177
Non Patent Literature 2: Yoshito Otake: Journal of Society of Rubber Science and Technology, Japan, Vol. 81 (2008), No. 9, 376-382
Non Patent Literature 3: Jun Maki: Journal of The Surface Finishing Society of Japan, Vol. 62 (2011), No. 1, 20-24

SUMMARY OF THE INVENTION

Problem(s) to be Solved by the Invention

An object of the invention is, while using a lower-grade material than SUS436L, to assure salt corrosion resistance, which is inferior in stainless steel, particularly corrosion resistance in a gap.

In the technology of Patent Literature 4, in a feed oil pipe including a steel pipe member made of a lower-grade material than SUS436L and a metal fitting attached thereto, it is necessary to control an opening amount of a gap in a gap structure to 0.2 mm or more for covering an inside of the gap in the gap structure on a surface exposed to a chloride environment by electrodeposition coating. Technical development for controlling the opening amount of the gap uniformly by forming a projection on a gap-forming member has been required. An object of the invention is to provide a technology for assuring corrosion resistance in a gap structure regardless of an opening amount of a gap.

Means for Solving the Problem(s)

The inventors have noted the usefulness of a sacrificial corrosion prevention action of Al which is less consumed than Zn in a chloride environment as a means for assuring corrosion resistance in a gap. However, as described in Non Patent Literature 2, Al has little resistance to bioethanol. Therefore, when a plating seed of a member in contact with a fuel, such as an inlet pipe in Patent Literature 6, is changed from Zn to Al, Al rapidly is corroded, and therefore a sacrificial corrosion prevention effect is exhibited for a short time. Therefore, the inventors have devised a structure in which an aluminized stainless steel sheet is used for a metal fitting having a low possibility of adhesion of a fuel and a stainless steel plate is used for a steel pipe member in contact with a fuel, such as an inlet pipe in order to suppress corrosion of the steel pipe member. Based on the structure, the inventors have examined usefulness of sacrificial corrosion prevention of Al. First, a gap test piece with an aluminized stainless steel sheet in contact with a stainless steel plate and a gap test piece with stainless steel plates in contact with each other were manufactured to examine salt corrosion resistance. As a result, the inventors have found that crevice corrosion is suppressed by a sacrificial corrosion prevention action of an aluminized layer. In addition, the inventors have found that consumption of Al-plating is suppressed by covering a surface of a test piece in other parts than a gap by subjecting the parts to cation electrodeposition coating and that a life of corrosion resistance is extended. The inventors have clarified necessary conditions of an Al-plating weight per unit area for obtaining a predetermined life of corrosion resistance.

However, the above method utilizes a sacrificial corrosion prevention effect of Al-plating. Therefore, the plated part is melted more rapidly than stainless, and therefore the eluted Al may cause a problem. For example, in a case of a gap formed from an end of an inlet pipe and a metal fitting, such as an oil inlet, in a structure in which the metal fitting enters the inlet pipe as in Patent Literature 6, even when a hole is not formed in a stainless steel plate, eluted Al enters the inlet pipe and reacts with moisture to generate an Al-based corrosion product (e.g. aluminum hydroxide) having a low solubility and the Al-based corrosion product is precipitated at a bottom of a fuel tank. The Al-based corrosion product is accumulated in the fuel tank, and, in the end, may cause clogging in a fuel injection inlet to cause a serious accident. In view of the above, the inventors examined a method for attaching a metal fitting made of an aluminized stainless steel sheet. As a result, the inventors have found a structure in which Al does not enter a steel pipe member regardless of consumption of Al-plating by attaching an outer part of the steel pipe member and a metal fitting to predetermined positions.

The invention has a structure based on the above findings, and a gist thereof is as follows.

(1) An automotive member including: a non-aluminized member; a metal fitting made of an aluminized stainless steel sheet, the metal fitting being attached to the non-aluminized member by welding or brazing; and a gap structure defined between the non-aluminized member and the metal fitting, the gap structure being exposed to a chloride environment, in which the non-aluminized member is made of a ferritic stainless steel containing, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, one or both of 0.03% to 0.30% of Ti and 0.03% to 0.30% of Nb, and a balance in a form of Fe and inevitable impurities, the aluminized stainless steel sheet for the metal fitting having an Al-plating weight per unit area of 20 g/m$^2$ or more and 150 g/m$^2$ or less, and the metal fitting and the non-aluminized member are coated with a cation electrodeposition coating film having a thickness of 5 μm to 35 μm.

(2) The automotive member according to (1), further containing, in mass %, one or both of 0.0002% to 0.0050% of B and 0.01% to 0.50% of Sn.

(3) The automotive member according to (1) or (2), further containing, in mass %, one or more of 0.01% to 0.3% of Mo, 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, and 0.001% to 0.05% of Ga.

(4) The automotive member according to any one of (1) to (3), in which a material of the metal fitting has the same composition range as that of the steel pipe member.

(5) A feed oil pipe including: a non-aluminized steel pipe member; a metal fitting made of an aluminized stainless steel sheet, the metal fitting being attached to an outer circumferential surface of the non-aluminized steel pipe member by welding or brazing at a position not in contact with a fuel; and a gap structure defined between the non-aluminized member and the metal fitting, the gap structure being exposed to a chloride environment, in which the non-aluminized steel pipe member is made of a ferritic stainless steel containing, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, one or both of 0.03% to 0.30% of Ti and 0.03% to 0.30% of Nb, and a balance in a form of Fe and inevitable impurities, the metal fitting is made of an aluminized stainless steel sheet having an Al-plating weight per unit area of 20 g/m$^2$ or more and 150 g/m$^2$ or less, and the metal fitting and the non-aluminized steel pipe member being coated with a cation electrodeposition coating film having a thickness of 5 μm to 35 μm.

(6) The feed oil pipe according to (5), further containing, in mass %, one or both of 0.0002% to 0.0050% of B and 0.01% to 0.50% of Sn.

(7) The feed oil pipe according to (5) or (6), further containing, in mass %, one or more of 0.01% to 0.3% of Mo, 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, and 0.001% to 0.05% of Ga.

(8) The feed oil pipe according to any one of (5) to (7), in which a material of the metal fitting has the same composition range as that of the steel pipe member.

(9) The feed oil pipe according to any one of (5) to (8), where an oil inlet structure is defined in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

(10) An automotive member including: a non-aluminized member; a metal fitting made of an aluminized stainless steel sheet, the metal fitting being attached to the non-aluminized member; and a gap structure defined between the member and the metal fitting, the gap structure being exposed to a chloride environment, in which the non-aluminized member is made of a ferritic stainless steel containing, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, at most 0.30% of Ti, and at most 0.30% of Nb, one or both of Ti and Nb being at least 0.03%, and a balance in a form of Fe and inevitable impurities, the aluminized stainless steel sheet for the metal fitting having an Al-plating weight per unit area of 20 g/m² or more and 150 g/m² or less, and the metal fitting and the non-aluminized member being coated with a cation electrodeposition coating film having a thickness of 5 μm to 35 μm.

(11) The automotive member according to (10), further containing, in mass %, one or both of 0.0002% to 0.0050% of B and 0.01% to 0.50% of Sn.

(12) The automotive member according to (10) or (11), further containing, in mass %, one or more of 0.01% to 0.3% of Mo, 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, and 0.001% to 0.05% of Ga.

(13) The automotive member according to any one of (10) to (12), in which the composition of a material of the metal fitting has the same composition range as that of the steel pipe member.

(14) A feed oil pipe including: a non-aluminized steel pipe member; a metal fitting made of an aluminized stainless steel sheet, the metal fitting being attached to the steel pipe member; and a gap structure defined between a position on an outer circumferential surface of the non-aluminized steel pipe member not in contact with a fuel and the metal fitting, the gap structure being exposed to a chloride environment, in which the non-aluminized member is made of a ferritic stainless steel containing, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, at most 0.30% of Ti, and at most 0.30% of Nb, one or both of Ti and Nb being at least 0.03%, and a balance in a form of Fe and inevitable impurities, the aluminized stainless steel sheet for the metal fitting having an Al-plating weight per unit area of 20 g/m² or more and 150 g/m² or less, and the metal fitting and the non-aluminized member being coated with a cation electrodeposition coating film having a thickness of 5 μm to 35 μm.

(15) The feed oil pipe according to (11), further containing, in mass %, one or both of 0.0002% to 0.0050% of B and 0.01% to 0.50% of Sn.

(16) The feed oil pipe according to (14) or (15), further containing, in mass %, one or more of 0.01% to 0.3% of Mo, 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, and 0.001% to 0.05% of Ga.

(17) The feed oil pipe according to any one of (14) to (16), in which a material of the metal fitting has the same composition range as that of the steel pipe member.

(18) The feed oil pipe according to any one of (14) to (17), having an oil inlet structure in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

The invention can provide an inexpensive feed oil pipe stably assuring salt corrosion resistance, and therefore provides a large industrial effect.

That is, in a feed oil pipe including a steel pipe member made of a lower-grade material than SUS436L and a metal fitting attached to the steel pipe member, the technology of the invention can assure corrosion resistance by subjecting a surface of the metal fitting abutting on a gap exposed to a chloride environment to Al-plating when the gap in a gap structure has a small opening amount and covering surfaces of the steel pipe member and the metal fitting other than the gap with a cation electrodeposition coating film. On the other hand, when the opening amount is large, corrosion resistance can be assured by covering an inside of the gap in the gap structure on a surface exposed to a chloride environment with the electrodeposition coating. In addition, when the feed oil pipe is used to an oil inlet, by attaching an aluminized stainless steel metal component to an outer side of an inlet pipe in order to prevent invasion of consumed Al into the inlet pipe, clogging in a fuel injection inlet of an engine caused by an Al corrosion product can be suppressed and an accident can be prevented. In this way, corrosion resistance can be stably assured without particularly controlling a structure of the opening amount of the gap in the gap structure.

BRIEF DESCRIPTION OF DRAWING(S)

DESCRIPTION OF EMBODIMENT(S)

The invention will be described in detail below.

A member in the invention is a general term for a member whose inner surface is exposed to a fuel environment and whose outer surface is exposed to a chloride environment. A pipe-shaped member obtained by molding a steel pipe is referred to as a steel pipe member, which includes a main pipe, a breather, a fuel pipe, and the like. The main pipe is also referred to as an inlet pipe, and is a pipe configured to introduce a fuel into a fuel tank. A metal fitting is a general term for a component exposed only to a chloride environment and forming a gap between the metal fitting and a member or a steel pipe member, and includes a pipe support member, a metal component referred to as, for example, a stay or a bracket, and a member referred to as a cap protector or a retainer.

Figure 1A:
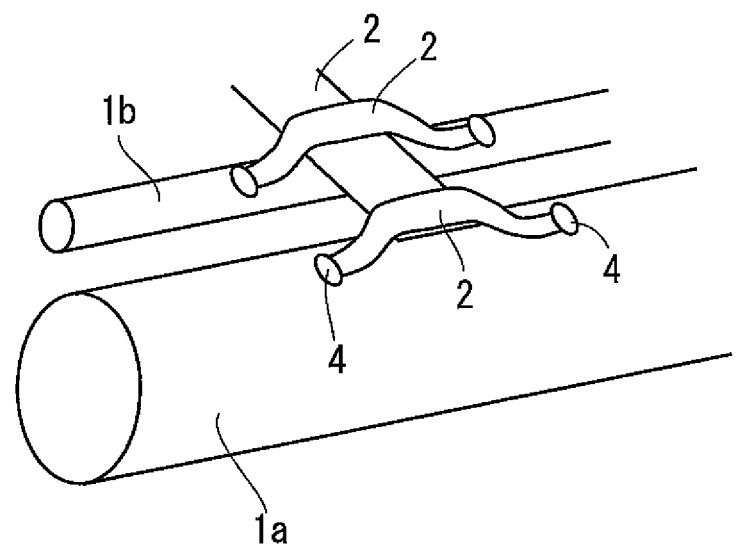
FIGS. 1A and 1B are views illustrating an exemplary gap structure of a gap existing in the central part of a feed oil pipe.
Figure 1B:
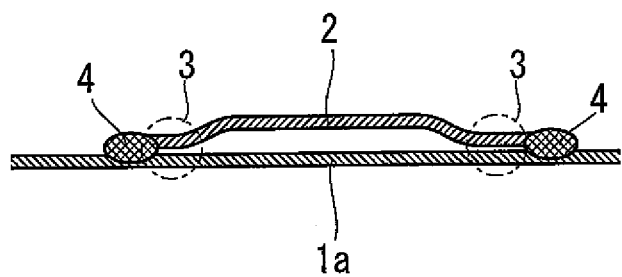
Figure 2A:
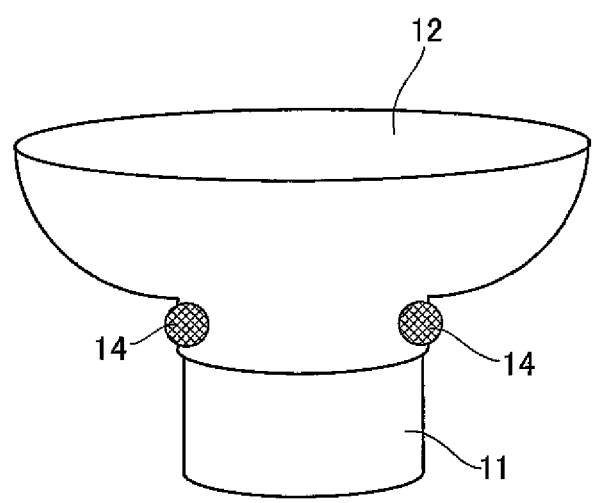
FIGS. 2A and 2B are views illustrating an exemplary gap structure of a gap existing in an oil inlet of a feed oil pipe.
Figure 2B:
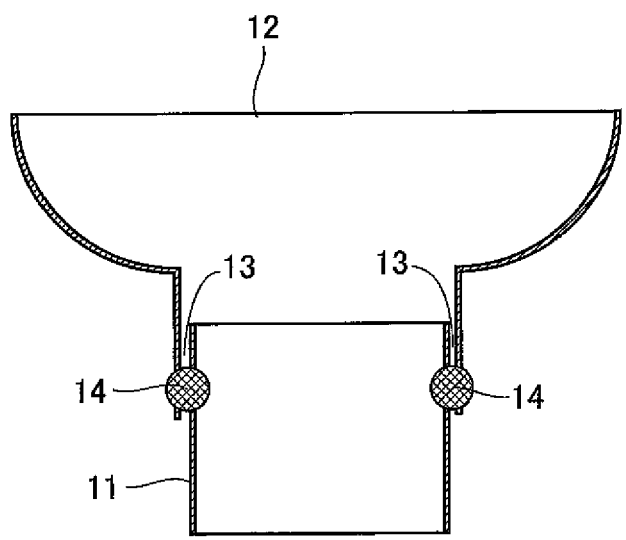

An automotive member of the invention and a feed oil pipe as a typical example thereof include gaps as illustrated in FIGS. 1A and 1B and FIGS. 2A and 2B, for example. FIGS. 1A and 1B illustrate the central part of a feed oil pipe. FIG. 1A is a schematic perspective view illustrating a metal fitting 2 for binding and fixing a main pipe 1a (steel pipe member 1) and a breather tube 1b (steel pipe member 1) to a car body, attached to the main pipe 1a and the breather tube 1b at weld portions 4 by welding. FIG. 1B is a schematic cross sectional view of an attachment part of the metal fitting 2 to the main pipe 1a. Both FIGS. 1A and 1B illustrate a gap 3 formed near the weld portion 4 between the metal fitting 2 and the steel pipe member 1 in a form of the main pipe 1a or the breather tube 1b. FIGS. 2A and 2B illustrate an oil inlet of a feed oil pipe. Here, the main pipe is referred to as an inlet pipe. FIG. 2A is a schematic perspective view illustrating a cap protector 12 (metal fitting 12) attached to an inlet pipe 11 (steel pipe member 11) at weld portion 14. FIG. 2B is a schematic cross sectional view of an attachment part of the metal fitting 12 to the inlet pipe 11. Both FIGS. 2A and 2B illustrate a gap 13 formed near the weld portion 14 between the metal fitting 12 and the inlet pipe 11 (the steel pipe member 11). In the invention, a part including the gap 3 or the gap 13 is referred to as a gap structure.

The target of the invention is a gap structure exposed to a chloride environment.

When an inside of such a gap is filled with salt water to be subjected to a wet and dry cycle, crevice corrosion occurs and grows to make a hole in the steel pipe member. In order to prevent the hole formation, it is important to suppress occurrence of crevice corrosion itself in addition to growth of crevice corrosion, for which sacrificial corrosion prevention is usually performed.

Zn is generally used as a sacrificial anode for sacrificial corrosion prevention, but is disadvantageously rapidly consumed in a chloride environment. On the other hand, when Al is used as a sacrificial anode, advantages including: relatively small consumption amount of Al in a chloride environment; a large amount of generated electricity; and being capable of serving as a reinforcing member by attaching Al to a steel plate by hot-dip plating are believed to be obtainable.

Accordingly, a gap test piece made of a stainless steel plate corresponding to a steel pipe member and an aluminized stainless steel sheet were initially manufactured to examine salt corrosion resistance.

The gap test piece was manufactured by overlapping a large plate having a size of t0.8×70×150 mm and a small plate having a size of t0.8×40×40 mm and spot-welding the central part of the large and small plates. The large plate corresponds to the steel pipe member, and a ferritic stainless steel plate was used therefor. The small plate corresponds to the metal fitting, and aluminized stainless steel sheets having various Al-plating weight per unit areas were used therefor. Large plates including components in Examples of the invention shown in Table 1 were used. Small plates obtained by subjecting stainless steel plates including components shown in Table 2 to Al-plating in various weight per unit areas were used. A part in which the large plate faces the small plate defines a gap.

The gap test piece was subjected to cation electrodeposition coating and then to a salt corrosion test. In cation electrodeposition coating, PN-110 manufactured by NIPPONPAINT Co., Ltd. was used as a coating material, electrification was performed at a bath temperature of 28 degrees C. and a coating voltage of 170 V, and conditions were selected such that the thickness of a coating film was from 2 μm to 40 μm in a general part (other parts than a gap on the surfaces of the large plate and the small plate). A baking condition was 170 degrees C.×20 minutes. The thicknesses of a coating film at five points were measured per a sample using an electromagnetic film thickness meter, and an average value thereof was used as a film thickness. In some test pieces, a weld nugget was punched after electrodeposition coating, and an inside of a gap was observed. It was confirmed that no coating film was formed inside the gap.

As a test for evaluating salt corrosion resistance of these gap test pieces, a compound cyclic corrosion test in a JASO mode (cyclic corrosion test regulated by JASO-M609-91 (repetition of spraying salt water: spraying 5% NaCl, 35 degrees C.×2 Hr, drying: relative humidity 20%, 60 degrees C.×4 Hr, and wetting: relative humidity 90%, 50 degrees C.×2 Hr)) was used. As a test period, 200 cycles were performed. After the test was finished, the corrosion depth in a gap was measured by a microscope focal depth method.

Figure 3:
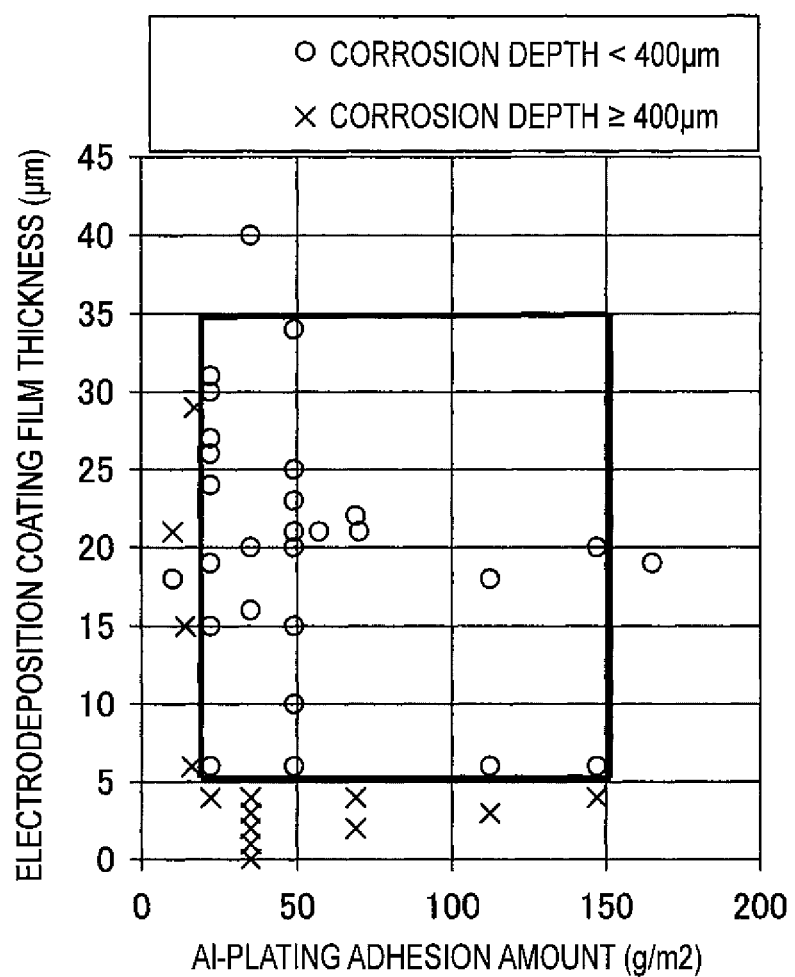
FIG. 3 is a diagram illustrating an influence of an Al-plating weight per unit area of a small plate of a gap test piece and a thickness of an electrodeposition coating film of the gap test piece on a depth of crevice corrosion.
Figure 4A:
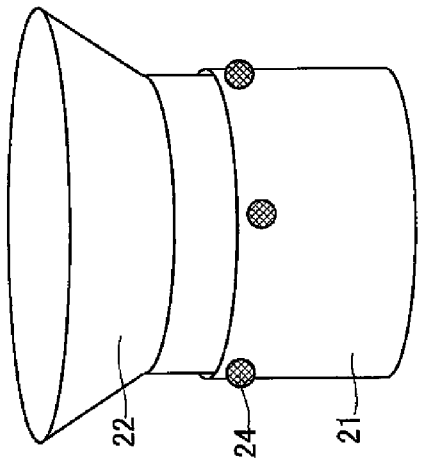
FIGS. 4A, 4B, 4C and 4D are views illustrating shapes of test pieces used for examining the structure.
Figure 4B:
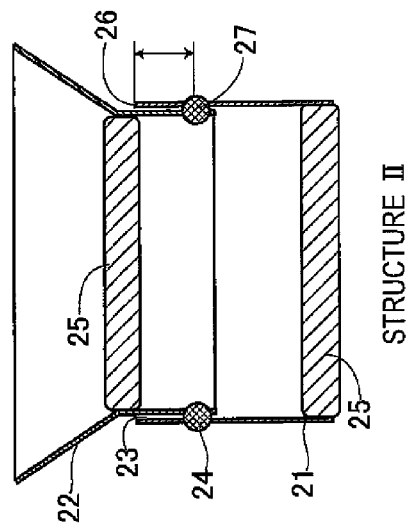
Figure 4C:
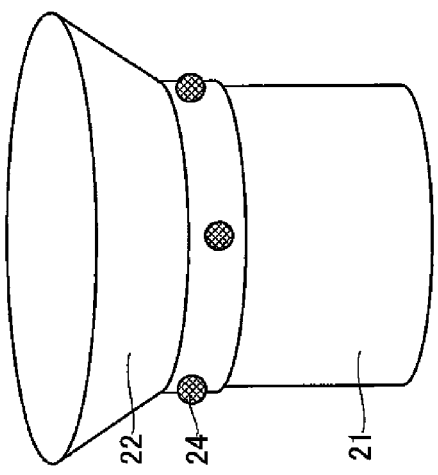
Figure 4D:
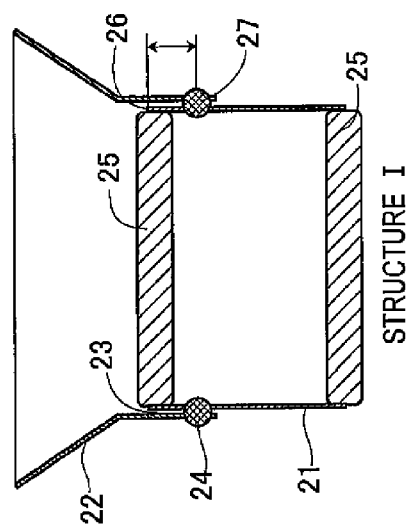

Test results are shown in FIG. 3. The results show that crevice corrosion can be significantly suppressed by a sacrificial corrosion prevention effect of Al of the aluminized stainless steel sheet of the small plate but an Al-plating weight per unit area and the thickness of a cation electrodeposition coating film have to be proper in order to obtain a satisfactory effect. Specifically, in order to maintain the sacrificial corrosion prevention effect for a long time, a larger absolute amount of Al is more advantageous. In order to maintain the large amount of Al, it is necessary to increase the initial absolute amount and to reduce consumption. FIG. 3 suggests that the initial absolute amount can be controlled by the Al-plating weight per unit area and reduction in Al consumption can be controlled by the thickness of a cation electrodeposition coating film on a general surface. FIG. 3 indicates that the Al-plating weight per unit area is required to be 20 g/m$^2$ or more and the thickness of the cation electrodeposition coating film is required to be 5 μm or more. Obviously, a larger Al-plating weight per unit area and a larger thickness of the cation electrodeposition coating film are more preferable. However, an upper limit of the Al-plating weight per unit area is 150 g/m$^2$, and an upper limit of the thickness of the cation electrodeposition coating film is 35 μm considering inexpensiveness. Here, on a surface of the small plate facing the large plate (gap), a cation electrodeposition coating film is not formed because of a gap and an aluminized surface is exposed. The surface Al in this exposed part contributes to sacrificial corrosion prevention.

As described above, the metal fitting in the invention is made of an aluminized stainless steel sheet, and requires 20 g/m$^2$ or more of Al-plating weight per unit area on a surface abutting on the gap. This is because satisfactory corrosion resistance cannot be obtained with a plating weight per unit area lower than the above value. On the other hand, a larger plating weight per unit area makes a life of corrosion resistance longer. However, the life can be extended to some degree by covering surfaces in other parts than a gap with a cation electrodeposition coating film, and the upper limit of the plating weight per unit area is 150 g/m$^2$ also considering cost. The "surface abutting on the gap" herein means a surface constituting the gap generated by the metal fitting coming close to or abutting on the member or the steel pipe member.

An aluminized stainless steel sheet manufactured by a hot-dip plating method can be used. A Type I aluminized stainless steel sheet manufactured using an Al-8% to 10% Si bath is more preferably usable than a Type II aluminized stainless steel sheet manufactured using a pure Al bath. This is because Type I has a smaller thickness of an alloy layer existing in an interface between a plated layer and a stainless basic material and causes less peeling of the plated layer during molding than Type II. Such a Type I aluminized layer usually contains about 10 mass % of Si and about 1 mass % of Al—Fe—Si intermetallic compound as described in Non Patent Literature 3. A material for the aluminized stainless steel sheet is preferably the same as that for the steel pipe member, and does not need to be at least a highly corrosion-resistant material having a larger alloy content than the steel pipe member.

A cation electrodeposition coating film is formed at least on a surface (referred to as "general surface") in other parts than an inside of the gap among the surfaces of the member, the steel pipe member, and the metal fitting. An electrodeposition coating film on the general surface limits a region which an Al corrosion prevention current reaches to the gap. This suppresses a consumption rate of Al and can extend a corrosion prevention life. The cation electrodeposition coating film requires a film thickness of 5 μm or more. On the other hand, a too large film thickness saturates the effect, and therefore the upper limit of the cation electrodeposition coating film is preferably 35 μm. Whether a cation electrodeposition coating film is formed on a surface of a gap of the member, the steel pipe member, or the metal fitting depends on an opening amount of the gap. When the opening amount of the gap is large enough for forming an electrodeposition coating film (0.2 mm or more), an electrodeposition coating film is formed in the gap of the member or the steel pipe member, so that generation of crevice corrosion can be prevented. On the other hand, when the opening amount of the gap is small and an electrodeposition coating film is not formed on a surface abutting on the gap, crevice corrosion occurs in this part of the member or the steel pipe member in the related art. However, in the invention, since the inside of the gap of the metal fitting is aluminized and an electrodeposition coating film is not formed in this part of the metal fitting, Al is exposed, so that sacrificial corrosion prevention effect by Al can be exhibited.

Furthermore, in order to prevent invasion of an Al component into the inlet pipe, which is a matter to be concerned when the invention is applied to an oil inlet member, an attachment structure of a metal fitting made of an aluminized stainless steel sheet was examined. A test piece obtained in the following manner was used as illustrated in FIGS. 4A, 4B, 4C and 4D. Specifically, a steel pipe 22 made of an aluminized stainless steel sheet simulating the metal fitting was welded to an outer surface and an inner surface of a ferritic stainless steel pipe 21 simulating the inlet pipe at four point spot weld portions 24 to form a gap 23. The ferritic stainless steel pipe 21 included components of No. E01 in Table 1, and had a shape of φ50×50L×0.8t mm. The aluminized stainless steel pipe 22 included components of No. A3 in Table 2, and had an Al-plating weight per unit area of 49 g/cm². When the aluminized stainless steel pipe 22 was welded to the outer surface of the ferritic stainless steel pipe 21 as in structure I in FIGS. 4A and 4B, the aluminized stainless steel pipe 22 had a shape of φ52×50L×0.8t mm. When the aluminized stainless steel pipe 22 was welded to the inner surface of the ferritic stainless steel pipe 21 as in structure II in FIGS. 4C and 4D, the aluminized stainless steel pipe 22 had a shape of φ48×50L×0.8t mm. The position (attachment position) of the weld portion 24 for attaching the aluminized stainless steel pipe 22 was changed within a range of 0 to 20 mm from an end of the ferritic stainless steel pipe 21.

The test piece was subjected to cation electrodeposition coating. In cation electrodeposition coating, PN-110 manufactured by NIPPONPAINT Co., Ltd. was used as a coating material, electrification was performed at a bath temperature of 28 degrees C. and a coating voltage of 170 V, and conditions were selected such that the thickness of a coating film was 30 μm in a general part (other parts than the gap 23 on the surfaces of the ferritic stainless steel pipe 21 and the aluminized stainless steel pipe 22). A baking condition was 170 degrees C.×20 minutes. The thicknesses of a coating film at five points were measured per a sample using an electromagnetic film thickness meter, and an average value thereof was used as a film thickness. In some test pieces, a weld nugget was punched after electrodeposition coating, and an inside of a gap was observed. It was confirmed that no coating film was formed inside the gap.

As a test for evaluating salt corrosion resistance of these gap test pieces, a compound cyclic corrosion test in a JASO mode (cyclic corrosion test regulated by JASO-M609-91 (repetition of spraying salt water: spraying 5% NaCl, 35 degrees C.×2 Hr, drying: relative humidity 20%, 60 degrees C.×4 Hr, and wetting: relative humidity 90%, 50 degrees C.×2 Hr)) was used as in the above. As a test period, 200 cycles were performed. During the test, as illustrated in FIGS. 4A, 4B, 4C and 4D, two parts of an upper part and a lower part in the steel pipe were sealed with silicone caps 25 such that eluted Al liquid did not flow into the ferritic stainless steel pipe 21 naturally.

After the test was finished, whether or not an Al corrosion product invaded the ferritic stainless steel pipe 21 was evaluated.

Test results are shown in Table 4. Any test piece did not have a hole generated by corrosion. However, in the structure II, an Al corrosion product invaded the ferritic stainless steel pipe from the consumed aluminized part. In addition, when a test piece had the structure I with an attachment position of less than 5 mm, an end surface of the steel pipe was corroded, and an Al corrosion product invaded the ferritic stainless steel pipe from a gap between the end and a silicone cap. Accordingly, it is found that when a test piece has the structure I with an attachment position of less than 5 mm from the ferritic stainless steel pipe, an Al corrosion product does not invade the ferritic stainless steel pipe.

In sum of the above, the automotive member having the gap structure exposed to a chloride environment chloride environment between the member made of ferritic stainless steel and the metal fitting molded from the aluminized stainless steel sheet and attached to the member, the Al-plating weight per unit area of the metal fitting being 20 g/m² or more and 150 g/m² or less on the surface abutting on the gap in the gap structure, and at least surfaces of the member and the metal fitting other than the gap being covered with the cation electrodeposition coating film having a thickness of 5 μm to 35 μm, can prevent crevice corrosion effectively regardless of the opening amount of the gap. The metal fitting is only required to be attached to the member to such a degree that both of the metal fitting and the member are electrically conductive with each other. Furthermore, when the invention is applied to an oil inlet, the metal fitting is preferably welded to an outer surface of the inlet pipe (steel pipe member) and at a position 5 mm or more apart from an end surface of the inlet pipe. With the above arrangement an effect of preventing invasion of an Al corrosion product into the inlet pipe can be exhibited.

Next, a method for manufacturing the above automotive member of the invention will be described. First, a metal fitting molded made of an aluminized stainless steel sheet having an Al-plating weight per unit area of 20 g/m² or more and 150 g/m² or less is attached to a member made of ferritic stainless steel. The metal fitting is preferably attached to the member by welding or brazing. A gap is formed near the attachment part between the member and the metal fitting. This gap is located at a position exposed to a chloride environment. A part including the gap is referred to as a gap structure. In this way, the gap structure exposed to a chloride environment is formed between the member and the metal fitting made of an aluminized stainless steel sheet and attached to the member. Next, surfaces of the metal fitting and the member are covered with a cation electrodeposition coating film having a thickness of 5 μm to 35 μm by cation electrodeposition coating. The metal fitting having Al-plating attached thereto is attached to the member. Therefore, the Al-plating weight per unit area of the metal fitting is 20 g/m² or more and 150 g/m² or less on a surface abutting on the gap formed near the attachment part. The automotive member of the invention is an automotive member manufactured in such a manner as described above.

By using a steel pipe member made of a steel pipe as the above member, the automotive member of the invention can be used suitably as a feed oil pipe.

Next, materials of the member and the steel pipe member will be described. The steel pipe member herein means a pipe-shaped member such as a main pipe (inlet pipe) or a breather tube which is filled with fuel gas. A material described below is preferably used for the metal fitting.

A feature of the invention is the use of an inexpensive material with a lower content of an alloy element than SUS436L without an element for improving corrosion resistance such as Ni or Cu in addition to Mo. Specifically, a ferritic stainless steel having the following composition is used as the material. Hereinafter, the percentage (%) of the content means mass %.

C, N: Each of C and N is an element to cause intergranular corrosion at part being influenced by welding heat and deteriorates corrosion resistance and cold workability. Accordingly, the content of C or N should be limited to as low level as possible. The upper limit of the content of C or N is preferably 0.015%, and more preferably 0.010%. The lower limit value is not particularly specified, but is preferably 0.0010% for C and 0.0050% for N considering refining cost.

Cr: Cr is a basic element to assure corrosion resistance after heating, a proper content of Cr is essential, and the lower limit of the content of Cr is necessary to be 10.5%. On the other hand, the upper limit of the content is preferably set to 18.0% in view of deterioration in workability due to the presence of Cr and for the purpose of suppressing alloy cost. A range of the content of Cr is preferably from 13.0% to 17.5%, and more preferably from 16.0% to 17.5%. In the invention, the content of Cr is preferably less than 13.0%, and more preferably 12.0% or less from a viewpoint of pursuing a lower-grade material.

Ti, Nb: Ti and Nb fix C and N as a carbonitride to suppress intergranular corrosion. Accordingly, one or both of Ti and Nb are/is contained. However, an excessive content of Ti and Nb saturates the effect, and therefore the upper limit of each content of Ti and Nb is set at 0.30%. It should be noted that, when the content of at least one of Ti and Nb is 0.03% or more, the effect can be exhibited. As a proper content of Ti or Nb, the total content of both of the elements is five times or more and 30 times or less of the total content of C and N. The total content of Ti and Nb is preferably from 10 times to 25 times as much as the total content of C and N.

Si: Si is useful as a deoxidizing element in a refining step, and is contained with a lower limit of 0.01%. On the other hand, a large amount of Si deteriorates workability and thus should not be contained. The upper limit of Si content is preferably limited to 0.80%. A preferable range of Si content is from 0.10% to 0.50%.

Mn: 0.01% or more of Mn is contained as a deoxidizing element and an element for fixing S. However, a large amount of Mn deteriorates workability and thus should not be contained. The upper limit of Mn content is preferably limited to 0.80%. A preferable range of Mn content is from 0.10% to 0.50%.

P: P is an impurity element that significantly deteriorates workability. Therefore, the content of P is preferably at a level as low as possible. The upper limit of an allowable content of P is 0.050%. The upper limit value of a preferable content of P is 0.030%. The lower limit value of P is not particularly specified, but is preferably 0.010% considering refining cost.

S: S is an impurity element that deteriorates corrosion resistance. Therefore, the content of S is preferably at a level as low as possible. The upper limit of an allowable content of S is 0.010%. The upper limit value of a preferable content of S is 0.0050%. The lower limit value of S is not particularly specified, but is preferably 0.0005% considering refining cost.

Al: Al is useful as a deoxidizing element, and 0.010% or more of Al is contained. However, a large amount of Al should not be contained because of deteriorating workability, and the upper limit is preferably limited to 0.100%. The upper limit of the content of A; is preferably 0.080%.

In addition to the above elements, the following alloy elements may be contained in order to adjust various characteristics of steel.

B: B is an element useful for preventing secondary working embrittlement or hot workability deterioration without affecting corrosion resistance. Therefore, B is contained with a lower limit of 0.0002%. However, the content of more than 0.0050% deteriorates hot workability, and therefore the upper limit of B is preferably 0.0050%. The upper limit of the content of B is more preferably 0.0020%.

Sn: Sn is an element useful for improving corrosion resistance with a small content thereof, and is contained within such a range as not to impair inexpensiveness. When the content of Sn is less than 0.01%, an effect of improving corrosion resistance is not exhibited. When the content is more than 0.50%, cost is significantly increased and workability is deteriorated. Therefore, a proper range of the content is from 0.01% to 0.50%. The content is preferably from 0.05% to 0.30%.

In addition to the above elements, the following elements may be contained within a such range as not to impair the effect of the invention.

Mo: Mo is an element which exhibits an effect for repairing a passive state film, is very effective for improving corrosion resistance, and particularly improves pitting corrosion resistance in combination with Cr. Therefore, when Mo is added, 0.01% or more of Mo is preferably contained. When the content of Mo is increased, corrosion resistance is improved, but workability is deteriorated and cost is increased. Therefore, the upper limit of Mo content is 0.3%. A preferable range of Mo content is from 0.01% to 0.1%.

Cu, Ni: Cu and Ni suppress a corrosion rate when corrosion progresses, and the content of Cu and Ni is preferably from 0.01% to 0.5%. However, an excessive content thereof deteriorates workability, and therefore the content of Cu and Ni is preferably from 0.01% to 0.3%.

Sb, Zr, Co, W: Sb, Zr, Co, or W improves corrosion resistance, and therefore can be added, as necessary. These elements are important for suppressing a corrosion rate. However, an excessive content thereof deteriorates manufacturability and cost. Therefore, the range of Sb, Zr, Co and W content is from 0.005% to 0.5%. A more preferable range of Sb, Zr, Co and W content is from 0.05% to 0.4%.

V: V improves crevice corrosion resistance, and therefore can be added, as necessary. However, an excessive content of V deteriorates workability and saturates an effect for improving corrosion resistance. Therefore, the lower limit of V content is 0.03%, and the upper limit V content is 0.5%. A more preferable range of V content is from 0.05% to 0.30%.

Ga: Ga is an element to contribute to improving corrosion resistance and workability, and can be contained in an amount of 0.001% to 0.05%.

Stainless steel having the above composition is manufactured as a steel plate by a typical method for manufacturing a stainless steel plate, including: melting and refining a steel piece in a converter or an electric furnace; and subjecting the steel piece to hot rolling pickling, cold rolling, annealing, finish pickling, and the like. Furthermore, by using this steel plate as a material, a welded pipe is manufactured by a typical method for manufacturing a stainless steel pipe, such as electric resistance welding, TIG welding, or laser welding.

The stainless steel pipe is formed into a feed oil pipe through typical molding and assembling steps such as cold plastic working (for example, bending, expanding, or drawing), or attachment of various metal fittings by welding (for example, spot welding, projection welding, MIG welding, or TIG welding), brazing, or bolts and nuts.

Examples

Exemplary embodiment(s) of the invention will be described in detail below with reference to Examples. Initially, the components of the ferritic stainless steel, the Al-plating weight per unit area of the aluminized stainless steel sheet, and the thickness of the cation electrodeposition coating film will be described.

150 kg of ferritic stainless steel having the composition shown in Table 1 was melted in a vacuum furnace, was cast into a 50 kg steel ingot, and then was subjected to the steps of hot rolling, hot rolled plate annealing, pickling-cold rolling, annealing, and finishing pickling to manufacture a steel plate having a thickness of 0.8 mm. A large plate having a size of t0.8×70×150 mm was taken from this steel plate material. The large plate simulated the member or the steel pipe member (feed oil pipe itself). In Table 1, Nos. X8, X9, X10, and X12 each contained an excessive amount of Si, Mn, P, and Al, and caused edge cracking during cold rolling. Therefore, the workability thereof was determined to be insufficient, and these samples were not subjected to the subsequent test for corrosion resistance.

Ferritic stainless steel having the composition shown in Table 2 was melted in a converter, and then was subjected to the steps of casting, hot rolling, hot rolled plate annealing, pickling, cold rolling, annealing, finishing pickling and hot-dip Al-plating to manufacture an aluminized stainless steel sheet having a thickness of 0.8 mm. A small plate having a size of t0.8×40×40 mm was taken from this aluminized stainless steel sheet material. The small plate simulated the metal fitting.

A gap test piece was manufactured by overlaying the small plate on the large plate and subjecting the central part the small plate and the large plate to one point spot welding. The gap is defined around a part at which the large plate faces and contacts the small plate.

The gap test piece was subjected to cation electrodeposition coating and then to a salt corrosion test. In cation electrodeposition coating, PN-110 manufactured by NIPPONPAINT Co., Ltd. was used as a coating material, electrification was performed at a bath temperature of 28 degrees C. and a coating voltage of 170 V, and conditions were selected such that the thickness of a coating film was from 2 μm to 40 μm in the general part. A baking condition was 170 degrees C.×20 minutes. The thicknesses of a coating film at five points were measured per a sample using an electromagnetic film thickness meter, and an average value thereof was used as a film thickness. The gap of the gap test piece had a very small opening amount except No. 40. Therefore, an electrodeposition coating film was not formed in the gap, a stainless steel basic material was exposed in the gap of the large plate, and an aluminized film was exposed in the gap of the small plate.

As a test for evaluating salt corrosion resistance of these gap test pieces, a compound cyclic corrosion test in a JASO mode (cyclic corrosion test regulated by JASO-M609-91 (repetition of spraying salt water: spraying 5% NaCl, 35 degrees C.×2 Hr, drying: relative humidity 20%, 60 degrees C.×4 Hr, and wetting: relative humidity 90%, 50 degrees C.×2 Hr)) was used. As a test period, 200 cycles were performed. After the test was finished, a gap test piece was dismantled by punching a weld nugget, and was subjected to a rust removing treatment. Thereafter, the corrosion depth in the gap of the large plate was measured by a microscope focal depth method. The thicknesses at ten points were measured per a test piece, and a maximum value of the measurements was used as a representative value of the sample. A target (satisfactory) corrosion resistance was defined at a maximum corrosion depth of being less than a half the plate thickness (400 μm).

Test standards and test results are shown in Table 3.

TABLE 1

| section | No. | chemical component of large plate (mass %) | | | | | | | | | | notes |
|---|---|---|---|---|---|---|---|---|---|---|---|---|
| | | C | Si | Mn | P | S | Al | Cr | Ti | Nb | N | others | |
| the invention | E01 | 0.0031 | 0.45 | 0.25 | 0.017 | 0.0008 | 0.052 | 10.70 | 0.201 | — | 0.0062 | — | |
| | E02 | 0.0042 | 0.14 | 0.21 | 0.018 | 0.0011 | 0.051 | 13.09 | 0.038 | 0.151 | 0.0071 | — | |
| | E03 | 0.0035 | 0.10 | 0.08 | 0.019 | 0.0009 | 0.016 | 14.01 | — | 0.293 | 0.0088 | — | |
| | E04 | 0.0038 | 0.45 | 0.40 | 0.017 | 0.0011 | 0.021 | 15.06 | 0.205 | — | 0.0075 | — | |
| | E05 | 0.0083 | 0.22 | 0.71 | 0.018 | 0.0041 | 0.052 | 16.05 | 0.201 | — | 0.0073 | 0.0005B | |
| | E06 | 0.0049 | 0.13 | 0.27 | 0.020 | 0.0021 | 0.035 | 17.01 | 0.198 | — | 0.0096 | — | |
| | E07 | 0.0036 | 0.25 | 0.31 | 0.043 | 0.0017 | 0.072 | 11.03 | — | 0.179 | 0.0068 | — | |
| | E08 | 0.0034 | 0.25 | 0.30 | 0.020 | 0.0015 | 0.041 | 17.96 | 0.041 | 0.153 | 0.0076 | — | |
| | E09 | 0.0044 | 0.76 | 0.35 | 0.019 | 0.0012 | 0.028 | 14.06 | — | 0.210 | 0.0071 | 0.10Sn | |
| | E10 | 0.0018 | 0.20 | 0.25 | 0.021 | 0.0011 | 0.041 | 16.91 | 0.021 | 0.181 | 0.0065 | 0.11Sn—0.0016B | |
| | E11 | 0.0035 | 0.20 | 0.24 | 0.021 | 0.0009 | 0.045 | 17.21 | — | 0.196 | 0.0063 | — | |
| | E12 | 0.0036 | 0.03 | 0.32 | 0.026 | 0.0018 | 0.059 | 16.28 | — | 0.142 | 0.0068 | — | |
| | E13 | 0.0038 | 0.21 | 0.29 | 0.034 | 0.0026 | 0.043 | 14.38 | — | 0.264 | 0.0071 | 0.05Sn—0.0042B | |
| | E14 | 0.0041 | 0.25 | 0.38 | 0.017 | 0.0017 | 0.069 | 17.21 | 0.281 | — | 0.0082 | 0.43Sn | |
| | E15 | 0.0034 | 0.18 | 0.44 | 0.021 | 0.0007 | 0.084 | 16.70 | 0.207 | 0.260 | 0.0081 | | |
| | E16 | 0.0041 | 0.16 | 0.51 | 0.036 | 0.0006 | 0.092 | 17.10 | 0.231 | — | 0.0067 | 0.1Mo | |
| | E17 | 0.0015 | 0.17 | 0.36 | 0.027 | 0.0012 | 0.054 | 13.80 | 0.070 | 0.234 | 0.0045 | | |
| | E18 | 0.0036 | 0.43 | 0.21 | 0.064 | 0.0013 | 0.024 | 11.90 | 0.068 | 0.147 | 0.0072 | 0.1Cu | |
| | E19 | 0.0044 | 0.26 | 0.19 | 0.038 | 0.0007 | 0.010 | 17.21 | 0.081 | 0.241 | 0.0007 | 0.2Ni | |
| | E20 | 0.0065 | 0.17 | 0.56 | 0.037 | 0.0015 | 0.037 | 16.43 | 0.064 | 0.186 | 0.0087 | 0.1W | |
| | E21 | 0.0026 | 0.41 | 0.48 | 0.014 | 0.0021 | 0.071 | 12.98 | 0.071 | 0.148 | 0.0098 | 0.2V | |
| | E22 | 0.0031 | 0.35 | 0.39 | 0.034 | 0.0020 | 0.084 | 16.47 | — | 0.108 | 0.0094 | 0.01Sb | |
| | E23 | 0.0038 | 0.26 | 0.52 | 0.017 | 0.0016 | 0.068 | 15.39 | 0.036 | 0.261 | 0.0086 | | |

TABLE 1-continued

| | | colspan="11" | chemical component of large plate (mass %) | | | | | | | | | |
|---|---|---|---|---|---|---|---|---|---|---|---|---|
| section | No. | C | Si | Mn | P | S | Al | Cr | Ti | Nb | N | others | notes |
| | E24 | 0.0039 | 0.14 | 0.41 | 0.018 | 0.0009 | 0.097 | 14.63 | 0.107 | 0.172 | 0.0077 | 0.1Zr | |
| | E25 | 0.0031 | 0.33 | 0.31 | 0.039 | 0.0016 | 0.007 | 17.54 | 0.181 | — | 0.0093 | | |
| | E26 | 0.0035 | 0.47 | 0.29 | 0.018 | 0.0026 | 0.024 | 13.41 | 0.200 | 0.083 | 0.0091 | 0.05Co | |
| | E27 | 0.0036 | 0.59 | 0.17 | 0.020 | 0.0009 | 0.037 | 12.01 | 0.174 | 0.134 | 0.0084 | | |
| | E28 | 0.0033 | 0.63 | 0.07 | 0.017 | 0.0022 | 0.074 | 11.38 | 0.186 | — | 0.0071 | 0.0025Ga | |
| | E29 | 0.0033 | 0.72 | 0.26 | 0.021 | 0.0010 | 0.081 | 11.47 | — | 0.151 | 0.0086 | | |
| | E30 | 0.0031 | 0.16 | 0.37 | 0.008 | 0.0011 | 0.810 | 11.02 | 0.168 | — | 0.0099 | | |
| Comparative | X01 | 0.0028 | 0.10 | 0.09 | 0.021 | 0.0011 | 0.069 | 17.15 | 0.211 | — | 0.0067 | 1.15Mo | SUS436L |
| Example | X02 | 0.0029 | 0.45 | 0.25 | 0.020 | 0.0009 | 0.061 | <u>10.36</u> | 0.190 | — | 0.0069 | — | |
| | X03 | <u>0.0159</u> | 0.10 | 0.09 | 0.021 | 0.0011 | 0.063 | 11.20 | 0.109 | — | 0.0089 | — | |
| | X04 | 0.0099 | 0.09 | 0.10 | 0.022 | 0.0015 | 0.061 | 11.11 | 0.113 | — | <u>0.0154</u> | — | |
| | X05 | 0.0028 | 0.12 | 0.19 | 0.020 | 0.0012 | 0.069 | 14.01 | — | — | 0.0067 | — | |
| | X06 | 0.0028 | 0.10 | 0.21 | 0.019 | 0.0011 | 0.059 | 17.01 | <u>0.314</u> | — | 0.0067 | — | |
| | X07 | 0.0029 | 0.11 | 0.26 | 0.023 | 0.0010 | 0.055 | 11.05 | — | <u>0.309</u> | 0.0068 | — | |
| | X08 | 0.0032 | <u>0.92</u> | 0.36 | 0.023 | 0.0011 | 0.049 | 11.06 | 0.206 | 0.169 | 0.0083 | — | |
| | X09 | 0.0026 | 0.14 | <u>1.36</u> | 0.027 | 0.0008 | 0.044 | 13.35 | 0.156 | 0.175 | 0.0093 | — | |
| | X10 | 0.0038 | 0.18 | 0.42 | <u>0.063</u> | 0.0013 | 0.062 | 15.66 | 0.136 | 0.186 | 0.0075 | — | |
| | X11 | 0.0056 | 0.26 | 0.36 | 0.022 | <u>0.0240</u> | 0.054 | 11.35 | 0.147 | 0.156 | 0.0082 | — | |
| | X12 | 0.0083 | 0.13 | 0.14 | 0.018 | 0.0017 | <u>0.165</u> | 16.58 | 0.169 | 0.140 | 0.0063 | — | |
| | X13 | 0.0067 | 0.27 | 0.24 | 0.017 | 0.0018 | 0.068 | 17.42 | 0.035 | <u>0.326</u> | 0.0084 | — | |
| | X14 | 0.0092 | 0.30 | 0.27 | 0.026 | 0.0016 | 0.042 | 11.04 | <u>0.316</u> | 0.036 | 0.0053 | — | |
| | X15 | 0.0046 | 0.38 | 0.39 | 0.024 | 0.0011 | 0.026 | 10.90 | <u>0.018</u> | <u>0.024</u> | 0.0063 | — | | underlined: outside the range of the invention

TABLE 2

| | | | chemical component of small plate (mass %) | | | | | | | | | Al-plating weight per unit area | |
|---|---|---|---|---|---|---|---|---|---|---|---|---|---|
| section | No. | C | Si | Mn | P | S | Al | Cr | Ti | Nb | N | others | (g/m2) | notes |
| the | A1 | 0.0031 | 0.11 | 0.25 | 0.017 | 0.0008 | 0.052 | 10.70 | 0.201 | — | 0.0062 | — | 147 | |
| invention | A2 | 0.0035 | 0.10 | 0.35 | 0.019 | 0.0011 | 0.049 | 10.75 | 0.198 | — | 0.0065 | — | 22 | |
| | A3 | 0.0032 | 0.10 | 0.35 | 0.020 | 0.0010 | 0.050 | 11.02 | 0.199 | — | 0.0065 | — | 49 | |
| | A4 | 0.0035 | 0.10 | 0.35 | 0.021 | 0.0008 | 0.049 | 11.15 | 0.200 | — | 0.0065 | — | 112 | |
| | A5 | 0.0036 | 0.10 | 0.35 | 0.022 | 0.0010 | 0.051 | 11.45 | 0.198 | — | 0.0065 | — | 69 | |
| | A6 | 0.0028 | 0.10 | 0.08 | 0.019 | 0.0009 | 0.049 | 14.01 | — | 0.167 | 0.0068 | 0.10Sn | 57 | |
| | A7 | 0.0039 | 0.09 | 0.27 | 0.020 | 0.0021 | 0.035 | 17.01 | 0.198 | — | 0.0086 | — | 35 | |
| | A8 | 0.0039 | 0.10 | 0.09 | 0.021 | 0.0011 | 0.069 | 10.81 | 0.211 | — | 0.0067 | — | 70 | |
| Comparative | D1 | 0.0028 | 0.15 | 0.09 | 0.021 | 0.0011 | 0.069 | 17.15 | 0.211 | — | 0.0067 | — | <u>17</u> | |
| Example | D2 | 0.0029 | 0.10 | 0.25 | 0.020 | 0.0009 | 0.061 | 14.01 | 0.190 | 0.170 | 0.0069 | — | <u>10</u> | |
| | D3 | 0.0039 | 0.10 | 0.09 | 0.021 | 0.0011 | 0.069 | 11.05 | 0.211 | — | 0.0067 | — | <u>16</u> | |
| | D4 | 0.0028 | 0.10 | 0.09 | 0.021 | 0.0011 | 0.069 | 11.12 | 0.211 | — | 0.0067 | — | <u>14</u> | |
| | D5 | 0.0037 | 0.10 | 0.09 | 0.021 | 0.0011 | 0.069 | 10.81 | 0.184 | — | 0.0067 | — | <u>165</u> | | underlined: outside the range of the invention

TABLE 3

| section | No. | material of large plate | material of small plate | plating weight per unit area of small plate (g/m2) | thickness of electro-deposition coating film (μm) | maximum corrosion depth (μm) | notes |
|---|---|---|---|---|---|---|---|
| the | 1 | E01 | A3 | 49 | 34 | 201 | |
| invention | 2 | E02 | A3 | 49 | 25 | 197 | |
| | 3 | E03 | A3 | 49 | 10 | 273 | |
| | 4 | E04 | A3 | 49 | 21 | 179 | |
| | 5 | E05 | A3 | 49 | 23 | 163 | |
| | 6 | E06 | A2 | 22 | 15 | 290 | |
| | 7 | E07 | A3 | 49 | 15 | 225 | |
| | 8 | E08 | A2 | 22 | 6 | 356 | |
| | 9 | E09 | A2 | 22 | 24 | 254 | |
| | 10 | E10 | A2 | 22 | 30 | 269 | |
| | 11 | E11 | A3 | 49 | 6 | 249 | |
| | 12 | E12 | A2 | 22 | 27 | 241 | |
| | 13 | E13 | A2 | 22 | 31 | 271 | |
| | 14 | E14 | A2 | 22 | 26 | 263 | |
| | 15 | E06 | A1 | 147 | 20 | 140 | |
| | 16 | E06 | A2 | 22 | 19 | 200 | |

TABLE 3-continued

| section | No. | material of large plate | material of small plate | plating weight per unit area of small plate (g/m2) | thickness of electro-deposition coating film (μm) | maximum corrosion depth (μm) | notes |
|---|---|---|---|---|---|---|---|
| | 17 | E06 | A4 | 112 | 18 | 143 | |
| | 18 | E06 | A5 | 69 | 22 | 151 | |
| | 19 | E06 | A6 | 57 | 21 | 165 | |
| | 20 | E06 | A7 | 35 | 20 | 198 | |
| | 21 | E06 | A8 | 70 | 21 | 210 | |
| | 22 | E06 | A1 | 147 | 6 | 171 | |
| | 23 | E09 | A4 | 112 | 6 | 208 | |
| | 24 | E15 | A3 | 49 | 30 | 250 | |
| | 25 | E16 | A3 | 49 | 30 | 281 | |
| | 26 | E17 | A3 | 49 | 30 | 291 | |
| | 27 | E18 | A3 | 49 | 30 | 341 | |
| | 28 | E19 | A3 | 49 | 30 | 216 | |
| | 29 | E20 | A3 | 49 | 30 | 271 | |
| | 30 | E21 | A3 | 49 | 30 | 310 | |
| | 31 | E22 | A3 | 49 | 30 | 267 | |
| | 32 | E23 | A3 | 49 | 30 | 242 | |
| | 33 | E24 | A3 | 49 | 30 | 231 | |
| | 34 | E25 | A3 | 49 | 30 | 271 | |
| | 35 | E26 | A3 | 49 | 30 | 294 | |
| | 36 | E27 | A3 | 49 | 30 | 318 | |
| | 37 | E28 | A3 | 49 | 30 | 342 | |
| | 38 | E29 | A3 | 49 | 30 | 331 | |
| | 39 | E30 | A3 | 49 | 30 | 367 | |
| | 40 | E01 | A3 | 49 | 34 | 230 | large opening amount |
| Comparative Example | 101 | E01 | A1 | 147 | <u>4</u> | 750 | |
| | 102 | E02 | A5 | 69 | <u>4</u> | 730 | |
| | 103 | E03 | A4 | 112 | <u>3</u> | 729 | |
| | 104 | E04 | A7 | 35 | <u>4</u> | 710 | |
| | 105 | E05 | A7 | 35 | <u>3</u> | 705 | |
| | 106 | E06 | A7 | 35 | <u>1</u> | 698 | |
| | 107 | E07 | A7 | 35 | <u>1</u> | 650 | |
| | 108 | E08 | A5 | 69 | <u>2</u> | 641 | |
| | 109 | E09 | A7 | 35 | <u>3</u> | 736 | |
| | 110 | E10 | A2 | 22 | <u>4</u> | 701 | |
| | 111 | E11 | A7 | 35 | <u>0</u> | >800 | |
| | 112 | E06 | <u>D1</u> | <u>17</u> | 29 | 701 | |
| | 113 | E06 | <u>D2</u> | <u>10</u> | 21 | >800 | |
| | 114 | E06 | <u>D3</u> | <u>16</u> | 6 | 791 | |
| | 115 | E06 | <u>D4</u> | <u>14</u> | 15 | >800 | |
| | 116 | E06 | <u>D5</u> | <u>165</u> | 19 | 150 | equivalent to No. 12, 14 |
| | 117 | E06 | A7 | 35 | <u>40</u> | 200 | equivalent to No. 17 |
| | 118 | <u>X02</u> | A7 | 35 | 19 | 741 | |
| | 119 | <u>X03</u> | A7 | 35 | 19 | 405 | |
| | 120 | <u>X04</u> | A7 | 35 | 18 | 495 | |
| | 121 | <u>X05</u> | A7 | 35 | 20 | 701 | |
| | 122 | <u>X06</u> | A7 | 35 | 16 | 200 | equivalent to No. 17 |
| | 123 | <u>X07</u> | A3 | 49 | 20 | 185 | equivalent to No. 7 |
| | 124 | <u>X11</u> | A8 | 70 | 26 | >800 | |
| | 125 | <u>X13</u> | A1 | 147 | 34 | 226 | equivalent to No. 11 |
| | 126 | <u>X14</u> | A6 | 57 | 14 | 210 | equivalent to No. 1 |
| | 127 | <u>X15</u> | A3 | 49 | 18 | >800 | |
| | 128 | <u>X01</u> | <u>X01</u> | — | 20 | >800 | |
| Reference Example | 129 | E01 | A7 | <u>12</u> | 18 | 324 | large opening amount | underlined: outside the range of the invention

All of Nos. 1 to 39 in Examples of the invention had a maximum corrosion depth of 400 μm or less, and was excellent. No. 40 had the same condition as No. 1, but had an opening amount of the gap of 0.2 mm, which was intentionally enlarged. The opening was formed based on the method described in paragraph [0042] of Patent Literature 4. Under the above condition, a coating film was also formed in the gap, but the gap of the large plate was covered with an electrodeposition coating. As a result, excellent corrosion resistance could be assured.

Comparative Example No. 128 shows the results of the test where SUS436L was used as a material and the small plate was not aluminized. Both the large plate and the small plate were made of X01 (SUS436L), and were subjected to electrodeposition coating. However, crevice corrosion passed through the plate thickness, which indicates that this corrosion test was sufficiently severe. No. 129 (Reference Example) had a large opening amount of the gap. The opening was formed based on the method described in paragraph [0042] of Patent Literature 4. The gap opening amount was 0.2 mm. As a result of formation of a coating film also in the gap, the Al-plating weight per unit area was outside the range of the invention (lower than the lower limit). However, it was confirmed that necessary corrosion resistance could be assured as a result of coverage of the gap by electrodeposition coating.

Even in such a corrosion test, Nos. 1 to 39 in the invention exhibited satisfactory corrosion resistance due to the sacrificial corrosion prevention action of Al-plating and the Al consumption suppressing action of the electrodeposition coating film.

On the other hand, Comparative Examples Nos. 101 to 111 each had an insufficient thickness of an electrodeposition coating film, and Comparative Examples Nos. 112 to 115 each had an insufficient Al-plating weight per unit area. Accordingly, these Comparative Examples did not exhibit satisfactory corrosion resistance. Comparative Examples Nos. 118 to 121, 124, and 127 each had a composition of the large plate outside the range of the invention, and therefore exhibited insufficient corrosion resistance. Though Comparative Example No. 116 had an excessive Al-plating weight per unit area resulting in a high cost, Comparative Example No. 116 only exhibited corrosion resistance equivalent to Nos. 12 and 14 in the invention having a smaller adhesion amount. Though Comparative Example No. 117 had an excessive thickness of an electrodeposition coating film resulting in a high cost, Comparative Example No. 117 only exhibited corrosion resistance equivalent to No. 17 in the invention having a smaller film thickness. Comparative Examples Nos. 122, 123, 125, and 126 each had an excessive content of Ti or Nb as a material of the large plate resulting in a high cost, but only exhibited corrosion resistance equivalent to Nos. 17, 7, 11, and 1 in the invention using a material having the same content of Cr and a smaller content of Ti or Nb.

An attachment structure of an aluminized stainless steel metal fitting to a ferritic stainless steel pipe member will be described.

150 kg of ferritic stainless steel having the composition shown in E01 of Table 1 was melted in a vacuum furnace, was cast into a 50 kg steel ingot, and then was subjected to the steps of hot rolling, hot rolled plate annealing, pickling-cold rolling, annealing, and finishing pickling to manufacture a steel plate having a thickness of 0.8 mm. Using this steel plate material, a steel pipe having a size of φ50×50×t0.8 mm was manufactured by seam welding to obtain the ferritic stainless steel pipe 21. The ferritic stainless steel pipe 21 simulated an inlet pipe. Ferritic stainless steel having the composition shown in A3 of Table 2 was melted in a converter, and then was subjected to the steps of casting, hot rolling, hot rolled plate annealing, pickling, cold rolling, annealing, finishing pickling and hot-dip Al-plating to manufacture an aluminized stainless steel sheet having a thickness of 0.8 mm. The Al-plating weight per unit area was 49 g/cm². Using this aluminized stainless steel sheet material, parts having sizes of φ48×50×t0.8 mm and φ52×50×t0.8 mm were manufactured by punching and press molding to obtain the aluminized stainless steel pipes 22. The aluminized stainless steel pipe 22 simulated a metal fitting.

As illustrated in FIGS. 4A, 4B, 4C and 4D, using the three types of steel pipes manufactured, the aluminized stainless steel pipe 22 was welded to an outside or an inside of the ferritic stainless steel pipe 21 at an attachment position 27 along an outer periphery 0 mm to 20 mm apart from an end 26 of the ferritic stainless steel pipe 21 by four point spot welding (weld portion 24) to manufacture a test piece. A gap 23 is defined at a part at which the ferritic stainless steel pipe 21 faces the aluminized stainless steel pipe 22 to be in contact therewith.

The test piece was subjected to cation electrodeposition coating. In cation electrodeposition coating, PN-110 manufactured by NIPPONPAINT Co., Ltd. was used as a coating material, electrification was performed at a bath temperature of 28 degrees C. and a coating voltage of 170 V, and conditions were selected such that the thickness of a coating film was from 30 μm in the general part. A baking condition was 170 degrees C.×20 minutes. The thicknesses of a coating film at five points were measured per a sample using an electromagnetic film thickness meter, and an average value thereof was used as a film thickness. The gap 23 of the gap test piece had a very small opening amount. Therefore, an electrodeposition coating film was not formed in the gap 23, a stainless steel basic material was exposed in the gap of the ferritic stainless steel pipe 21, and an aluminized film was exposed in the gap of the aluminized stainless steel pipe 22.

As illustrated in FIGS. 4A, 4B, 4C and 4D, insides of two parts of an upper part and a lower part in the steel pipe were sealed with silicone caps 25, and each of these gap test pieces was subjected to a salt corrosion test at an attitude tilted by 45°. As a test for evaluating salt corrosion resistance, a compound cyclic corrosion test in a JASO mode (cyclic corrosion test regulated by JASO-M609-91 (repetition of spraying salt water: spraying 5% NaCl, 35 degrees C.×2 Hr, drying: relative humidity 20%, 60 degrees C.×4 Hr, and wetting: relative humidity 90%, 50 degrees C.×2 Hr)) was used. As a test period, 200 cycles were performed. After the test was finished, the silicone caps were removed, and whether or not an Al corrosion product invaded the ferritic stainless steel pipe was checked.

Test standards and test results are shown in Table 4. None of the test pieces did not have a hole in the ferritic stainless steel pipe. In other words, all of Examples of the invention and Reference Examples shown in Table 4 exhibit the effect of the invention.

TABLE 4

| section | No. | structure | attachment position (mm) | invasion of Al into steel pipe |
|---|---|---|---|---|
| the invention | a | I | 5 | not observed |
| | b | I | 10 | not observed |
| | c | I | 15 | not observed |
| | d | I | 20 | not observed |
| Reference Example | 1a | I | 0 | observed |
| | 1b | I | 3 | observed |
| | 1c | II | 0 | observed |
| | 1d | II | 5 | observed |
| | 1e | II | 10 | observed |
| | 1f | II | 15 | observed |
| | 1g | II | 20 | observed |

Each of Nos. a to d in Examples of the invention had structure I with the attachment position 27 of 5 mm or more from the end 26 of the ferritic stainless steel pipe. In any one of Nos. a to d, invasion of an Al corrosion product into the ferritic stainless steel pipe could not be observed.

Each of Nos. 1a and 1b (Reference Examples) had the structure I with the attachment position 27 of less than 5 mm from the end 26 of the ferritic stainless steel pipe. An end surface of the steel pipe was corroded due to a liquid reservoir, and an Al corrosion product invaded the ferritic stainless steel pipe from a gap between the end and the silicone cap. Comparative Examples 1c to 1g had the structure II. An Al corrosion product invaded the ferritic stainless steel pipe from the aluminized part consumed.

By such a corrosion test, it could be confirmed that Nos. a to d in Examples of the invention exhibited satisfactory corrosion resistance due to a sacrificial corrosion prevention action of Al-plating and an Al consumption suppressing action of an electrodeposition coating film and causes no invasion of an Al corrosion product into the ferritic stainless steel pipe.

The invention claimed is:

1. An automotive member, comprising:
a non-aluminized member;
a metal fitting made of an aluminized stainless steel sheet, the metal fitting being attached to the non-aluminized member by welding or brazing; and
a gap structure defined between the member and the metal fitting, the gap structure being exposed to a chloride environment,
wherein the non-aluminized member is made of a ferritic stainless steel comprising, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, at most 0.30% of Ti, and at most 0.30% of Nb, one or both of Ti and Nb being at least 0.03%, and a balance in a form of Fe and inevitable impurities,
the aluminized stainless steel sheet for the metal fitting has an Al-plating weight per unit area of 20 g/m$^2$ or more and 150 g/m$^2$ or less, and
the metal fitting and the non-aluminized member are coated with a cation electro-deposition coating film having a thickness of 5 μm to 35 μm.

2. The automotive member according to claim 1, further comprising, in mass %, one or both of 0.0002% to 0.0050% of B and 0.01% to 0.50% of Sn.

3. The automotive member according to claim 1, further comprising, in mass %, one or more of 0.01% to 0.3% of Mo, 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, and 0.001% to 0.05% of Ga.

4. The automotive member according claim 1, wherein a composition of a material of the metal fitting has the same composition range as a composition of the non-aluminized member.

5. A feed oil pipe, comprising:
a non-aluminized steel pipe member;
a metal fitting made of an aluminized stainless steel sheet, the metal fitting being attached to an outer circumferential surface of the non-aluminized steel pipe member by welding or brazing at a position not in contact with a fuel; and
a gap structure defined between the non-aluminized steel pipe member and the metal fitting, the gap structure being exposed to a chloride environment,
wherein the non-aluminized steel pipe member is made of a ferritic stainless steel comprising, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, at most 0.30% of Ti, and at most 0.30% of Nb, one or both of Ti and Nb being at least 0.03%, and a balance in a form of Fe and inevitable impurities,
the aluminized stainless steel sheet for the metal fitting has an Al-plating weight per unit area of 20 g/m$^2$ or more and 150 g/m$^2$ or less, and
the metal fitting and the non-aluminized steel pipe member are coated with a cation electro-deposition coating film having a thickness of 5 μm to 35 μm.

6. The feed oil pipe according to claim 5, further comprising, in mass %, one or both of 0.0002% to 0.0050% of B and 0.01% to 0.50% of Sn.

7. The feed oil pipe according to claim 5, further comprising, in mass %, one or more of 0.01% to 0.3% of Mo, 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, and 0.001% to 0.05% of Ga.

8. The feed oil pipe according to claim 5, wherein a composition of a material of the metal fitting has the same composition range as a composition of the steel pipe member.

9. The feed oil pipe according to claim 5, wherein an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

10. An automotive member comprising:
a non-aluminized member;
a metal fitting made of an aluminized stainless steel sheet, the metal fitting being attached to the non-aluminized member; and
a gap structure defined between the non-aluminized member and the metal fitting, the gap structure being exposed to a chloride environment,
wherein the non-aluminized member is made of a ferritic stainless steel containing, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, at most 0.30% of Ti, and at most 0.30% of Nb, one or both of Ti and Nb being at least 0.03%, and a balance in a form of Fe and inevitable impurities,
the aluminized stainless steel sheet for the metal fitting has an Al-plating weight per unit area of 20 g/m$^2$ or more and 150 g/m$^2$ or less on a surface abutting on a gap defined between the gap structure and the metal fitting, and
the metal fitting and the non-aluminized member not abutting on the gap are coated with a cation electro-deposition coating film having a thickness of 5 μm to 35 μm.

11. The automotive member according to claim 10, wherein a composition of a material of the metal fitting has the same composition range as a composition of the non-aluminized member.

12. The automotive member according to claim 10, further comprising, in mass %, one or both of 0.0002% to 0.0050% of B and 0.01% to 0.50% of Sn.

13. The automotive member according to claim 12, further comprising, in mass %, one or more of 0.01% to 0.3% of Mo, 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, and 0.001% to 0.05% of Ga.

14. The automotive member according to claim 12, wherein a composition of a material of the metal fitting has the same composition range as a composition of the non-aluminized member.

15. The automotive member according to claim 10, further comprising, in mass %, one or more of 0.01% to 0.3% of Mo, 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, and 0.001% to 0.05% of Ga.

16. The automotive member according to claim 15, wherein a composition of a material of the metal fitting has the same composition range as a composition of the non-aluminized member.

17. A feed oil pipe, comprising:

a non-aluminized steel pipe member;

a metal fitting made of an aluminized stainless steel sheet, the metal fitting being attached to the steel pipe member; and a gap structure defined between a position on an outer circumferential surface of the non-aluminized steel pipe member not in contact with a fuel and the metal fitting, the gap structure being exposed to a chloride environment, wherein the non-aluminized member is made of a ferritic stainless steel containing, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, at most 0.30% of Ti, and at most 0.30% of Nb, one or both of Ti and Nb being at least 0.03%, and a balance in a form of Fe and inevitable impurities, the aluminized stainless steel sheet for the metal fitting has an Al-plating weight per unit area of 20 $g/m^2$ or more and 150 $g/m^2$ or less on a surface abutting on a gap defined between the gap structure and the metal fitting, and the metal fitting and the non-aluminized member not abutting on the gap are coated with a cation electro-deposition coating film having a thickness of 5 μm to 35 μm.

18. The feed oil pipe according to claim 17, wherein an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

19. The feed oil pipe according to claim 17, further comprising, in mass %, one or both of 0.0002% to 0.0050% of B and 0.01% to 0.50% of Sn.

20. The feed oil pipe according to claim 19, further comprising, in mass %, one or more of 0.01% to 0.3% of Mo, 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, and 0.001% to 0.05% of Ga.

21. The feed oil pipe according to claim 20, wherein an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

22. The feed oil pipe according to claim 19, wherein a composition of a material of the metal fitting has the same composition range as a composition of the steel pipe member.

23. The feed oil pipe according to claim 22, wherein an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

24. The feed oil pipe according to any one of claim 19, wherein an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

25. The feed oil pipe according to claim 17, further comprising, in mass %, one or more of 0.01% to 0.3% of Mo, 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, and 0.001% to 0.05% of Ga.

26. The feed oil pipe according to claim 25, wherein a composition of a material of the metal fitting has the same composition range as a composition of the steel pipe member.

27. The feed oil pipe according to claim 26, wherein an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

28. The feed oil pipe according to claim 25, wherein an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

29. The feed oil pipe according to claim 17, wherein a composition of a material of the metal fitting has the same composition range as a composition of the steel pipe member.

30. The feed oil pipe according to claim 29, wherein an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

* * * * *